June 2, 1953 D. E. WILLIS 2,640,374
DUAL TRANSMISSION CONTROL
Filed Dec. 7, 1949 4 Sheets-Sheet 3

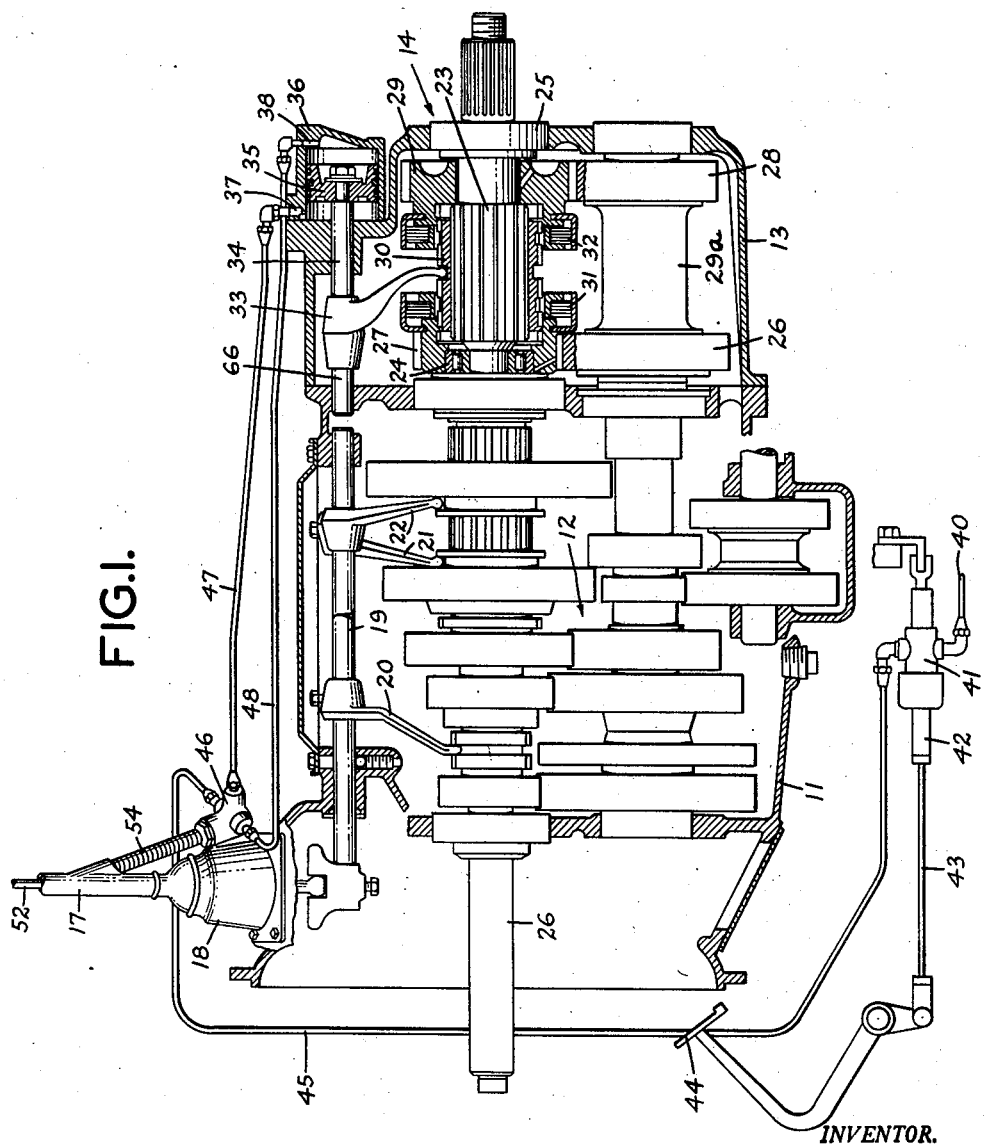

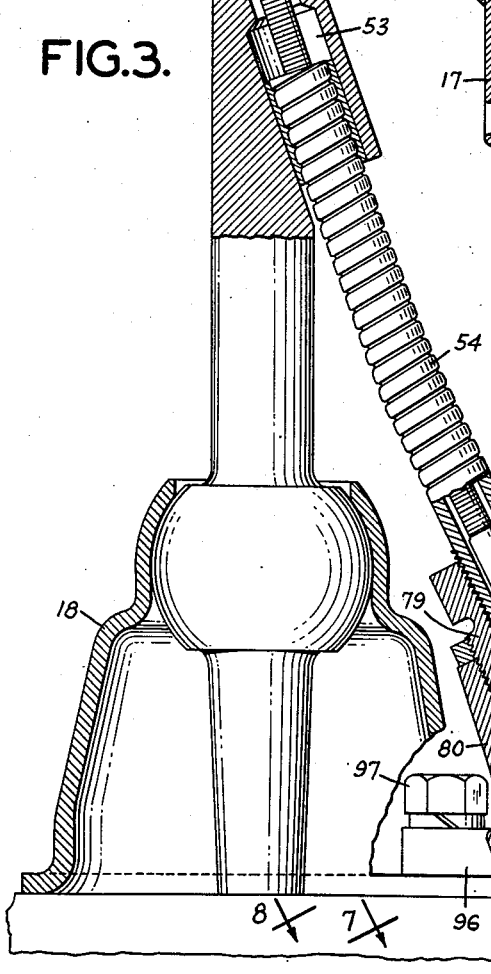
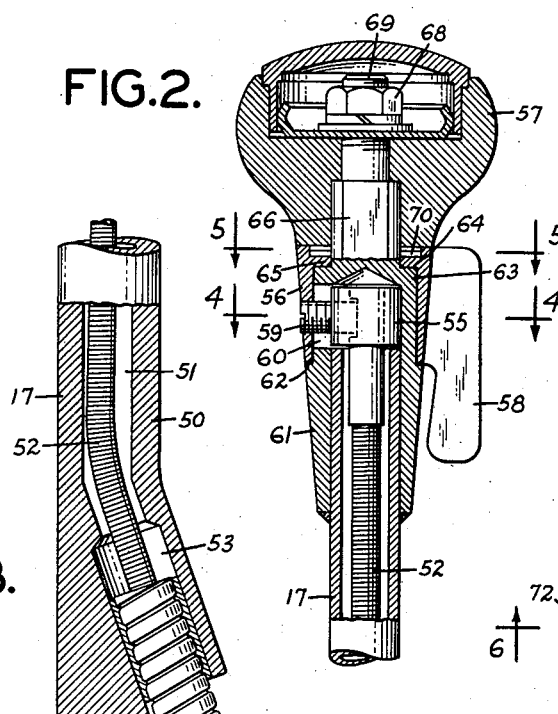
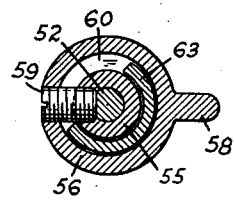
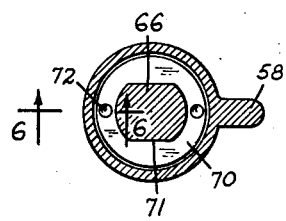
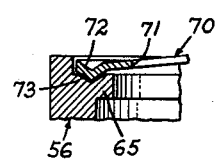

INVENTOR.
DELBERT ELWOOD WILLIS
BY
HIS ATTORNEYS.

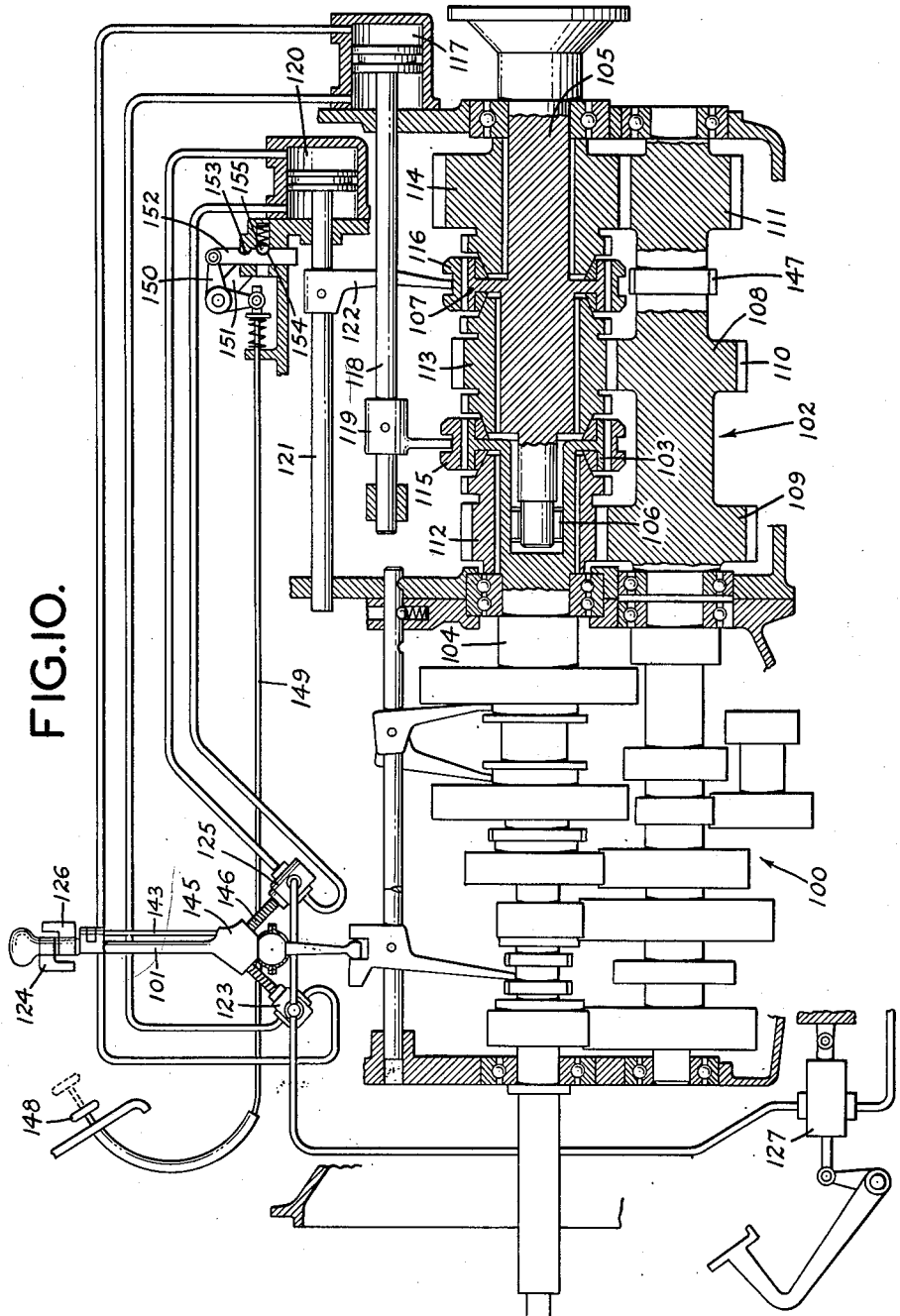

Patented June 2, 1953

2,640,374

UNITED STATES PATENT OFFICE 2,640,374

DUAL TRANSMISSION CONTROL

Delbert E. Willis, New Brunswick, N. J., assignor to Mack Manufacturing Corporation, New York, N. Y., a corporation of Delaware Application December 7, 1949, Serial No. 131,529

8 Claims. (Cl. 74—745)

This invention relates to improvements in transmissions for automotive vehicles such as trucks, buses and other similar high speed and heavy duty vehicles. It relates more particularly to improvements in the shifting mechanisms for transmissions of the type including a main change speed transmission and an auxiliary power shifted transmission.

For convenience and efficient operation, the present day truck transmissions usually have a conventional shift pattern so that the shifts may be made quickly without appreciable loss of vehicle speed and to maintain the engine speed at an efficient level. For this reason, heavy duty truck transmissions generally are manufactured with five ratios or speeds and when additional ratios are required, they are obtained by the addition of an auxiliary transmission or a two-speed axle controlled by a separate shifting mechanism.

It has been suggested that a convenient form of shifting mechanism may include a manual shifting lever for controlling the main transmission and a finger operated lever adjacent the knob on the main shifting lever by means of which the auxiliary tranmission can be shifted to split or double the ratios of the main transmission.

While such an arrangement is especially advantageous over the more usual transmissions including two separate shifting levers, the auxiliary control lever has not been too satisfactory in practical operation. There are several reasons for the failure of such a finger actuated lever to live up to expectations. The auxiliary transmission is usually controlled by the air pressure which is also used for operating the brakes of the vehicle. Inasmuch as the air pressure in the brake system usually is between 60 and 90 pounds per square inch, the valve for controlling the motor for the auxiliary system is subjected to high fluid pressure which has a tendency to force the valve plug tightly against a side of the valve casing, or endwise as well as sideways in the casing, if a conical valve is used, thereby tending to produce very high frictional resistance to movement of the finger controlled lever. As a result, it has been found that the finger lever cannot be actuated by the finger but must be grasped firmly, and twisted with considerable force in order to set it for selection of the proper gear ratio in the auxiliary transmission.

Moreover, the prior devices have included complicated link, lever and universal joint systems for coupling the finger control lever to the valve with the result that these elements set up additional frictional resistance to the movement of the finger lever and, moreover, are the source of servicing difficulties. Inasmuch as these elements are mounted on the transmission, which is, in most cases, below the floor boards of the vehicle, they are inaccessible for servicing and usually exposed to dirt, water and other corrosive or abrasive materials and, accordingly, the wear on these parts is excessive.

Transmissions embodying the present invention are constructed and arranged to overcome the above-mentioned disadvantages of the prior transmissions and are so arranged that the number of parts of the control for the auxiliary transmission is reduced to a minimum. Also, these parts are so protected from dirt and the like that infrequent servicing is required and such servicing can be accomplished with a minimum of difficulty. Moreover, the connections between the valve and the finger actuated lever are essentially direct and the valve is so constructed that it is balanced as to pressure, thereby reducing internal friction in the valve.

The simplified arrangement of the finger control lever and its operating connections to the auxiliary transmission makes it possible to use multiple finger control levers on the main gear shaft lever. In this way, additional power shifted auxiliaries may be included to increase the number of ratios in the combined main and auxiliary transmission, thereby providing a sufficient number of ratios that the transmission is entirely satisfactory for use in heavy duty, diesel powered trucks and other vehicles, which, as is well-known, operate most efficiently at engine speeds within relatively narrow ranges. Also, through the use of multiple finger actuated levers, it is possible to provide a power take off in the transmission which affords a very wide range of speed ratios.

For a better understanding of the present invention, reference may be had to the accompanying drawings, in which:

Fig. 1 is a view in longitudinal section of a typical transmission embodying the present invention with other operating connections shown diagrammatically therein;

Fig. 2 is a view in vertical section of the upper portion of the gearshift lever for controlling the main and auxiliary transmissions;

Fig. 3 is a view partly in section and partly broken away of the lower portion of the manual gearshift lever showing also the connection to the control valve for the auxiliary transmission;

Fig. 4 is a view in section taken on line 4—4 of Fig. 2;

Fig. 5 is a view in section taken on line 5—5 in Fig. 2;

Fig. 6 is a view in section of a detail of the device illustrating a detent for retaining the finger actuated lever in either of its two operative positions;

Fig. 10 is a view in longitudinal section and partly broken away of a modified form of main and auxiliary transmission including a duplex multispeed auxiliary transmission.

Figure 7:
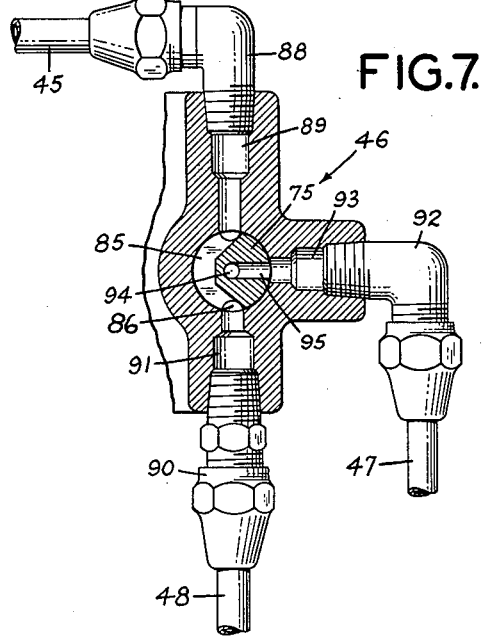
Fig. 7 is a view in section taken on line 7—7 of Fig. 3.

Referring now to Fig. 1, the transmission includes a casing 11 which houses a conventional manually shifted transmission system 12 having five forward speeds and one reverse speed. At the right-hand end of the casing 11 is a housing 13 enclosing an auxiliary two-speed transmission. The main transmission 12 is selectively controlled by means of a manual shift lever 17 shown in Figs. 1, 2 and 3 which is mounted in a tower or bell 18 for universal movement to change the speeds of the transmission by means of the usual shifter rails 19 and forks 20, 21 and 22.

The auxiliary transmission 14 includes a spline shaft 23 rotatably mounted in bearings 24 and 25 coaxial with the drive shaft 26 of the main transmission 12. The spline shaft 23 is connected to the propeller shaft of the vehicle (not shown) and is driven at different ratios by means of the gears 26, 27, 28 and 29. These gear pairs have different ratios to split or double the ratios of the main transmission in equal steps.

The gears 26 and 28 are fixed to the auxiliary countershaft 29a. The gear 27 is fixed to the mainshaft of the main transmission. The gear 29 is rotatably mounted on the spline shaft 23 but can be coupled to it selectively by means of a shiftable toothed clutch member 30 non-rotatably but axially slidable on the spline shaft. To prevent clashing during engagement of the clutch member, it and the gears 27 and 29 are provided with synchronizing clutches 31 and 32, for example, of the kind shown in the Bull Patent No. 2,397,943 dated April 9, 1946.

The clutch member 30 is shifted by means of a shifter fork 33 which is fixed to the shifter rail 34 slidably mounted in bushings in the ends of the casings 11 and 13. The shifter rail 34 carries a piston 35 at its outer end which is slidable in a cylinder 36 carried at the upper right-hand end of the casing 13. The cylinder 36 is provided with ports 37 and 38 at its opposite ends through which air under pressure is admitted to selectively move the piston and the clutch 30 either to the right or to the left.

The mechanism and the power system for controlling the movement of the piston 35 will now be described. As shown in Fig. 1, air is supplied from the air storage reservoir or tank (not shown), for example, of the brake system, by means of a pipe 40 to a valve 41 having a slide valve plunger 42 therein connected by means of a link 43 to the clutch pedal 44. The connection between the clutch pedal 44 and the valve 41 is such that the valve is open when the clutch pedal is depressed to disengage the clutch, not shown, and the valve 41 is closed when the clutch pedal is released and the clutch is engaged. Air under the control of the valve 41 is supplied by means of the pipe or conduit 45 to one port of a valve 46 for selective admission through the conduits 47 and 48 to the ports 37 and 38 of the cylinder. In this way the movement of the piston 35 in the cylinder 36 is responsive to movement of the clutch pedal so that a shifting movement of the piston 35 cannot occur unless the clutch pedal is depressed to unclutch the engine from the transmission. This arrangement makes it possible to pre-select the ratio of the auxiliary transmission 14 without shifting the auxiliary transmission until the clutch pedal has been depressed. In this way, single or multiple shifting operations of the main transmission 12 and/or the auxiliary transmission 14 may be accomplished.

The mechanism for actuating the valve 46 will now be described. Referring to Figs. 2 and 3, the shift lever 17 has a tubular upper portion 50 providing a passage 51 in which is mounted a flexible shaft 52. The lower end of the shaft 52 extends to the outside of the shift lever 17 through an inclined passage 53 having mounted therein a flexible cable sheath 54 for protecting the flexible shaft 52. The upper end of the shaft 52 is provided with a hub 55 which is connected to a sleeve 56 mounted just below the knob 57 on the upper end of the gearshift lever 17 in a convenient position for manipulation by the fingers while the hand is resting on the gearshift knob 57. To facilitate movement of the sleeve 56, it is provided with a flange or lever 58 extending generally lengthwise of the shaft. The sleeve 56 is connected to the hub 55 and the upper end of the shaft 52 by means of a set screw 59 which extends through an arcuate slot 60 (Fig. 4), in a sleeve member 61 fixed to the upper end of the shift lever 17 as by welding, brazing or the like. The sleeve 61 has a shoulder 62 on which the sleeve 56 rests and a reduced diameter portion 63 serving as a bearing for supporting the sleeve. The reduced portion 63 also has a shoulder 64 thereon upon which rests the inwardly extending flange 65 on the sleeve 56. The gearshift knob 57 is secured on a non-circular extension 66 of the member 61 by means of a nut 68 threaded on the threaded portion 69 of the extension.

The finger lever 58 is adapted to be retained in either of two limit positions as determined by the length of the slot 60 and by means of a spring detent construction best shown in Figs. 5 and 6. The spring detent consists essentially of a spring washer 70 having a non-circular opening 71 therein fitting the non-circular extension 66 of the sleeve 61. The edge of the washer 70 has punched down detents 72 which are engageable in one or two notches 73 in the flange 65 of the sleeve 56 near the limits of movement thereby releasably retaining the lever 58 in either of two angularly related positions.

The movement of the sleeve 56 and the finger lever 58 is transmitted by means of the flexible shaft 52 to the conical plug 75 of the valve member 46. The plug 75 is slidably connected to the end of the shaft by means of a flat extension 76 on the end of the shaft fitting in a slotted extension 77 on the upper end of the plug 75. The extension 77 extends through and positions radially a ball thrust bearing 78 which is held against upward movement by a coupling 79 threaded into the upper end of the valve casing 80 and also connected by means of threads 81 and a set screw 82 to the lower end of the sheath 54. The extension 77 is rotatably mounted in the coupling 79.

Figure 8:
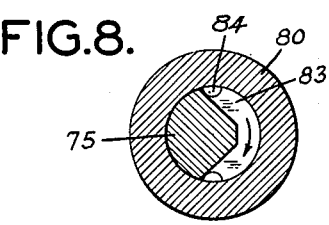
Fig. 8 is a view in section taken on line 8—8 of Fig. 3.
Figure 9:
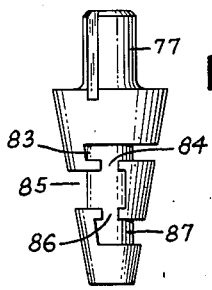
Fig. 9 is a view in elevation of the plug of the control valve of the system.

Normally, with conventional conical plug valves of the type referred to above, fluid pressure will tend to force the plug sideways in the casing and also exert a component of force axially of the plug to urge it axially of the casing, thereby setting up strong frictional resistance to the rotation of the plug. In order to overcome this frictional restraint, the plug, as best shown in Figs. 3, 7, 8 and 9, is provided with an upper groove 83 which extends slightly more than 180° around the periphery of the plug, as shown in Fig. 8. The passage or groove 83 is connected by means of vertically extending ports or passages 84 to another groove 85 on the opposite side of the valve and also extending slightly more than 180° around the periphery of the plug. The groove 85, is, in turn, connected by means of the passage 86 to another lower groove 87 extending around the same side of the plug as the groove 83 and through about the same angle. These grooves and passages cooperate with the several ports of the valve 46, as follows. As shown in Fig. 7, and as referred to generally above, the conduit 45 which supplies pressure is connected by means of an elbow and coupling 88 to the inlet port 89 of the valve 46 at one side thereof so that it can communicate with the passage 85. The conduit 48 leading to the right-hand end of the cylinder 36 is connected by means of a coupling 90 to an outlet port 91 in alignment with the port 89. The conduit 47 which is connected to the left-hand end of the cylinder 36 is connected by means of a suitable coupling 92 to the port 93 which is also in the same plane as the ports 89 and 91.

With the plug 75 in the position shown in Fig. 7, the pressure source is connected to the conduit 48, thereby normally urging the piston to the left when the clutch pedal 44 is depressed to admit air to the cylinder 36. When the plug 75 is rotated clockwise, it will connect the port 89 to the port 93, thereby making a connection for supplying air to the left-hand end of the cylinder 36 to urge the piston to the right.

Air is discharged from the low pressure side of the cylinder by means of an axial passage 94 in the plug 75 having a radially extending branch 95 on the same level as the ports 89, 91 and 93 and spaced diametrically from the center of the groove 85 so that it will communicate with the port 91 or 93 which is not connected to the line 45, thereby to discharge air to atmosphere (Figs. 3 and 7).

The movement of the valve is facilitated by the provision of the grooves 83 and 87 therein because the air also enters these grooves and acts to balance the radial pressure on the valve. The thrust bearing 78 permits the valve plug to turn easily despite the axial thrust developed by the fluid pressure. As a result, the valve plug turns very easily, and, because of the direct coupling between the plug and the finger lever 58, the latter may easily be moved by light finger pressure. Also, all of the parts of the device are protected and housed so that most infrequent servicing is required, and excellent protection against dirt is attained throughout the entire system. Moreover, the complicated links, levers, universal joints, and the like which characterize the prior devices are entirely eliminated, thereby reducing servicing problems and prolonging the life of the entire system.

The valve casing 80 preferably is supported in fixed position on the transmission housing, and to that end, it may be provided with a bracket or foot 96 which receives a machine screw 97 for holding it to the transmission casing 11.

In operation, the gearshift lever 17 may be used in the usual way to change the ratios of the main transmission 12. Also, the finger control lever 58 may be moved to condition the auxiliary transmission for moving the clutch member 30 to the right or the left. Movement of the finger lever 58 and the flexible shaft rotates the valve element 75 to make the desired connection between the conduit 45 and the conduit 47 or the conduit 48. When this selection has been made, a shifting action cannot occur until the clutch actuated valve 41 is opened by depressing the clutch pedal 44 to release the clutch. Once having pre-selected the ratios of the auxiliary transmission, the only other action required to shift the auxiliary transmission is to depress the clutch, whereupon air is supplied from the air system to the conduit 45 and through the valve 46 to move the piston 35 either to the right or left with a corresponding movement of the slidable clutch 30. In this way, the output or spline shaft 23 is coupled either directly to the gear 27 and the mainshaft of the main transmission or to the mainshaft through the reducing gears 27, 26, 28 and 29.

The above-described control system lends itself admirably to the use of multiple controls and multiple power auxiliaries to obtain even a greater number of ratios between the engine and the rear wheels. A typical example of a multiple auxiliary system is disclosed in Figs. 10 and 11. The complete transmission may include a conventional main transmission 100 having five forward and one reverse speeds controlled by the gear shift lever 101. Coupled with the transmission 100 is a multiple speed auxiliary 102 having a main clutch member 103 fixed to the output shaft 104 of the transmission. The output shaft 105 of the auxiliary is coaxial with the shaft 104 and has its inner end mounted in a bearing 106 within the hollow end of the shaft 104. The output shaft 105 also carries a fixed clutch member 107. The auxiliary also includes a countershaft 108 rotatably mounted in the casing of the transmission and having three gears 109, 110 and 111 thereon. These gears mesh respectively with the gears 112, 113 and 114. The gear 112 is mounted on an extension of the shaft 104 while the gears 113 and 114 are rotatable relative to and mounted on the output shaft 105. These pairs of gears have different ratios for splitting the ratios of the main transmission.

The drive shaft 104 may be coupled selectively to either the gear 112 or 113 by means of a shiftable clutch member 115 splined to the clutch member 103 and slidable axially thereof. Likewise, the gear 113 or the gear 114 may be coupled to the output shaft 105 by means of a shiftable clutch member 116 splined to the clutch member 107. It will be understood that all of these clutches will be provided with synchronizers of the type referred to above to permit clashless shifting of the clutch elements 115 and 116. The clutch element 115 is shifted by means of the fluid motor 117 and the usual shifter rail 118 and shifter fork 119. The clutch member 116 is shifted by means of the motor 120, shifter rail 121 and shifter fork 122. The motor 117 is controlled by means of a valve 123 like the valve 46 described above under the control of a finger actuated lever 124 mounted near the top of the gearshift lever 101. The motor 120 is controlled by means of a valve 125 under the control of the finger actuated lever 126 mounted below the lever 124. The valves 123 and 124 are, in turn, under the control of the clutch pedal actuated valve 127, as described above.

Figure 11:
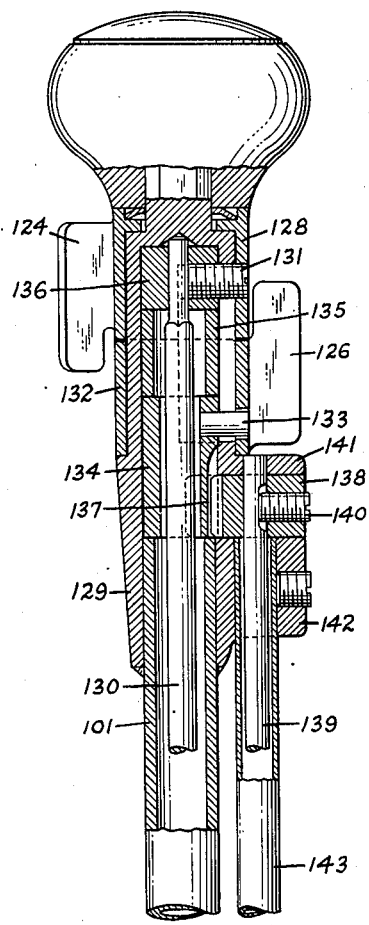
Fig. 11 is a view in section of the upper portion of the gearshift lever for controlling the main and auxiliary transmissions shown in Fig. 10.

Referring now to Fig. 11, the upper finger control lever 124 is similar to the finger lever 58 shown in Fig. 2 in that it includes a sleeve member 128 rotatably mounted on an extension or sleeve 129 fixed to the upper end of the shift lever shaft 101. The sleeve 128 is connected to the flexible shaft 130 extending along the hollow shaft 101. All other connections between the shaft 130 and the valve 123 are the same as disclosed in Figs. 2 and 3.

The finger lever 126 is fixed to and extends upwardly from the sleeve 132 which is also rotatably mounted on the extension 129 directly below the sleeve 128. The sleeve 132 is connected by means of a pin 133 to an internal sleeve 134 which is retained against axial movement by engagement with the upper end of the hollow gearshift lever shaft and a spacer 135 disposed below the hub 136 on the upper end of the flexible shaft 130. The sleeve 134 is rotatable and is provided with a gear segment 137 which meshes with a gear segment 138 secured to the upper end of the flexible shaft 139 by means of the set screw 140. The gear 138 is positioned by means of lugs 141 and 142 extending outwardly from the sleeve 129. The flexible shaft 139 is housed in a tube 143 extending downwardly to the base 145 of the gearshift lever. The shaft 139 extends out of the base 145 through a flexible sheath 146 and is connected at its lower end to the valve 125.

Both of the finger lever members may be provided with detents for releasably retaining them in either of their adjusted positions so that the clutches 115 and 116 are always clutched with one or the other of the gears 112 and 113 or 114, thereby establishing a drive from the input to the output shaft under all conditions.

Sometimes, it is desirable to have a power take off which can be used when the vehicle is not in motion. To that end, the countershaft 108 may be provided with a power take off gear 147 which may be connected in any suitable way to a pulley or to the drive element on the exterior of the transmission. Inasmuch as the auxiliary transmission is in driving connection with the output shaft, it is necessary to provide some means for disconnecting the auxiliary from the propeller shaft of the vehicle to leave the vehicle stationary while the power take off is operating. For this purpose, the instrument panel of the vehicle may be provided with a plunger 148 which is connected by means of a flexible shaft or cable 149 to one end of a bell crank lever 150 mounted on a bracket 151 on the transmission casing. The opposite end of the bell crank lever is connected to a plunger rod 152 which is slidably mounted in the bracket 151 for movement toward and away from the shifter rail 121 and into and out of the path of the shifter fork 122. The plunger 152 is retained in an upper or lower position by means of recesses 153 and 154 and a spring pressed ball detent 155 engageable therein.

In the position shown in Fig. 10, the plunger has no effect on the operation of the motor 120 or the clutch 116. However, if it is desired to use the power take off gear 144, the finger control 126 is moved to the position for shifting the clutch member 116 to the left to couple it with the gear 113 and the clutch pedal depressed to shift the clutch member 116. The plunger 148 is then pulled out to the dotted line position, thereby moving the plunger 152 downwardly toward the shifter rail 121 and into the path of the hub of the shifter fork to limit its movement to the right. The finger control lever 126 is then moved to the position for shifting the clutch to the right, so that the clutch member 116 is shifted to the right thereby releasing the gear 113 from the shaft 105. However, the hub of the fork 122 comes into engagement with the plunger 152 so that the clutch 116 cannot couple the gear 114 to the output shaft 105 whereby the output shaft is not driven. The countershaft 108 will be driven because the clutch 115 on the main transmission shaft 104 is in engagement with either the clutch of the gear 112 or the clutch of the gear 113 thereby driving the power take off gear 147 through the gear 109 or the gear 110.

From the preceding description, it will be apparent that the above-described control system for the main transmission and the power shifted auxiliary is easily operated and controlled, requires little servicing and also affords a wide range of ratios with a relatively simple transmission system. Also, the system permits the use of a power take off system with a power shifted auxiliary, thereby greatly increasing the utility of the transmission.

It will be understood, of course, that the structural details and the mounting of the finger actuated controls may be modified, that the main and auxiliary transmissions may be altered as to design and ratios depending upon space and operating requirements and that many other changes may be made in the transmission as a whole without departing from the invention. Therefore, the form of the invention described herein should be considered as illustrative and not as limiting the scope of the following claims.

I claim:

1. A shifting mechanism for an automotive vehicle having a main transmission, a manually actuated shift lever for shifting said transmission, a multispeed auxiliary transmission having a pair of shiftable clutch members therein to selectively provide more than two speed changes, and a separate fluid motor for shifting each of said clutch members; the combination of a separate valve to control each of said motors, each valve including a movable member for controlling the flow of fluid to its respective motor, a pair of sleeves rotatably mounted on said shaft lever adjacent to its outer end for rotation by the fingers, and a pair of flexible shafts extending lengthwise of said shift lever, one shaft being connected at one end to one of said movable members, and at its opposite end to one of said sleeves, and the other flexible shaft being connected at its opposite ends to the other sleeve and the other movable member.

2. The shifting mechanism set forth in claim 1, in which said shift lever has an internal passage opening to the exterior of said lever receiving part of one of said flexible shafts, and a tubular sheath mounted exteriorly of said shift lever enclosing the major portion of the other flexible shaft, and flexible sheaths interposed between said shift lever and said valves enclosing the remainders of said flexible shafts.

3. A shifting mechanism for an automotive vehicle having a main multispeed transmission, a manually actuated shift lever for shifting said transmission, an auxiliary transmission having an output shaft and a pair of shiftable clutch members to selectively couple and uncouple said output shaft and said main transmission and provide more than two speed changes at said output shaft, and a separate fluid-actuated motor for shifting each clutch member independently; the combination of a separate valve to control each motor, a separate manually actuated member for operating each valve to shift independently each of said clutch members, a blocking member in said auxiliary transmission movable into the path of one of said clutch members to prevent shifting of the latter in one direction to maintain said output shaft uncoupled from said main transmission, said blocking member being movable out of the path of the last-mentioned clutch member, and means for moving said blocking member into and out of the path of the last-mentioned clutch member.

4. The shifting mechanism set forth in claim 3 in which said auxiliary transmission includes an auxiliary power take off separate from said output shaft.

5. In a control system for a multispeed transmission including a main multispeed transmission, an auxiliary multispeed transmission coupled with the main transmission and a fluid pressure actuated motor for shifting said auxiliary transmission; the combination of a shift lever for shifting said main transmission, means supporting said lever at one end for movement in a shift pattern, said shift lever having a passage extending lengthwise therein and opening through a side of the lever adjacent said one end, a knob fixed to the other end of said lever, a sleeve rotatably mounted on said shift lever adjacent to said knob, a finger-engageable flange on said sleeve for rotating said sleeve relative to said knob and shift lever, a rotary valve fixed with respect to said means supporting said lever and adjacent to said one end of said lever, a shaft extending along said passage in said shift lever, means connecting one end of said shaft to said sleeve, said shaft having a flexible portion extending from said shift lever through said opening to said valve to connect the latter to said sleeve for rotation thereby and permit movement of said shift lever relative to said valve, and means to connect said valve to said motor and to a source of fluid under pressure to control said motor and shift said auxiliary transmission by rotation of said sleeve.

6. A shift control system for a vehicle transmission having a main multipseed transmission, an auxiliary multispeed transmission coupled with said main transmission and a fluid pressure actuated motor for shifting said auxiliary transmission; comprising a shift lever for shifting said main transmission, means supporting said shift lever at one end for movement in a shift pattern, a knob fixed to the other end of said shift lever, said shift lever having an internal passage extending lengthwise of said lever and spaced apart openings through a side of said lever adjacent to said knob and to said means supporting said lever, a sleeve rotatably mounted on said shift lever adjacent to said knob and overlying one of said openings, finger-engageable means on said sleeve to rotate said sleeve, a shaft inside and rotatable relative to said shift lever, means extending through said one of said openings to connect said sleeve to one end of said shaft, said shaft having a flexible portion extending through the other opening in said shaft, a valve mounted in fixed relation to the means supporting said shift lever adjacent to said one end of said shift lever and having a rotary plug connected to said flexible portion of said shaft, and means to connect said valve to a fluid pressure source and said motor to control the latter by rotation of said sleeve.

7. A shift control system for a vehicle transmission comprising a shift lever, means supporting said shift lever at one end for movement in a shift pattern, a knob fixed to the other end of said shift lever, a passage in and extending lengthwise of said shift lever and having at opposite ends openings through a side of the shift lever adjacent to said knob and adjacent to said means supporting said lever, a sleeve having a finger-engageable element thereon rotatably mounted on said shaft adjacent to said knob, a shaft extending along said passage and rotatable relative to said shift lever, means extending through one of said openings connecting said sleeve to one end of said shaft for simultaneous rotation, said shaft having a flexible portion extending through the other opening at the other end of said passage, and a valve mounted in fixed relation to said means supporting said shift lever and adjacent to said one end of said shift lever, said valve having a rotary valve plug connected to said flexible portion of said shaft for rotation therewith.

8. A shift control system for a vehicle transmission comprising a shift lever, means supporting said shift lever at one end for movement in a shift pattern, a knob fixed to the other end of said shift lever, a passage in and extending lengthwise of said shift lever and having at opposite ends openings through a side of the shift lever adjacent to said knob and adjacent to said means supporting said lever, a first sleeve having a finger-engageable element thereon rotatably mounted on said shaft adjacent to said knob, a first shaft extending along said passage and rotatable relative to said shift lever, means extending through one of said openings connecting said sleeve to one end of said shaft for simultaneous rotation, said shaft having a flexible portion extending through the other opening at the other end of said passage, a first valve mounted in fixed relation to said means supporting said shift lever and adjacent to said one end of said shift lever, said valve having a rotary valve plug connected to said flexible portion of said shaft for rotation therewith, a second sleeve having a finger-engageable element thereon rotatably mounted on said shift lever adjacent to said first sleeve, a second shaft extending lengthwise and on the exterior of said shift lever, means on said shift lever supporting said second shaft for rotation relative to said shift lever, gear means on said second shaft and said second sleeve connecting them for simultaneous rotation, and a second valve having a rotary plug mounted in fixed relation to said means supporting said shift lever adjacent to said one end of said shift lever, said second shaft having a flexible portion connected to said rotary plug of said second valve.

DELBERT E. WILLIS.

References Cited in the file of this patent

UNITED STATES PATENTS

| Number | Name | Date |
| --- | --- | --- |
| 1,119,364 | Morden | Dec. 1, 1914 |
| 1,691,417 | Ward | Nov. 13, 1928 |
| 1,856,192 | Roeder | May 3, 1932 |
| 1,883,743 | Maybach | Oct. 18, 1932 |
| 1,977,181 | Foresman | Oct. 16, 1934 |
| 2,026,220 | Denker | Dec. 31, 1935 |
| 2,229,933 | Parker | Jan. 28, 1941 |
| 2,239,795 | Parker | Apr. 29, 1941 |
| 2,445,716 | Sternberg | July 20, 1948 |